(12) United States Patent
Cornetti et al.

(10) Patent No.: US 12,486,821 B2
(45) Date of Patent: Dec. 2, 2025

(54) METHOD AND CONTROL UNIT FOR CONTROLLING A TURBOCHARGED HYDROGEN ENGINE

(71) Applicant: Robert Bosch GmbH, Stuttgart (DE)

(72) Inventors: Giovanni Cornetti, Weil der Stadt (DE); Gabriele Sgroi, Ostfildern (DE); Holger Kauss, Wernau (DE); Horst Mueller, Sachsenheim (DE); Moritz Hoess, Bietigheim-Bissingen (DE); Samuel Weinbrenner, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/834,731

(22) PCT Filed: Dec. 16, 2022

(86) PCT No.: PCT/EP2022/086390
§ 371 (c)(1),
(2) Date: Jul. 31, 2024

(87) PCT Pub. No.: WO2023/160862
PCT Pub. Date: Aug. 31, 2023

(65) Prior Publication Data
US 2025/0122858 A1    Apr. 17, 2025

(30) Foreign Application Priority Data
Feb. 22, 2022    (DE) ............... 10 2022 201 852.4

(51) Int. Cl.
*F02D 41/10* (2006.01)
*F02D 19/02* (2006.01)
*F02P 5/152* (2006.01)

(52) U.S. Cl.
CPC ............ *F02P 5/1521* (2013.01); *F02D 19/02* (2013.01); *F02D 41/10* (2013.01)

(58) Field of Classification Search
CPC ...... F02P 5/1521; F02P 5/1504; F02P 5/1528; F02D 19/02; F02D 41/00; F02D 41/10
See application file for complete search history.

(56) References Cited

U.S. PATENT DOCUMENTS

| 4,590,565 | A | * | 5/1986 | Takasu | ................. | F02P 5/1521 |
|---|---|---|---|---|---|---|
| | | | | | | 123/406.36 |
| 4,856,480 | A | * | 8/1989 | Nakajima | ............. | F02P 5/1521 |
| | | | | | | 123/406.35 |

(Continued)

FOREIGN PATENT DOCUMENTS

| DE | 102011081844 A1 | 2/2013 |
|---|---|---|
| DE | 102018122963 A1 | 3/2020 |

(Continued)

OTHER PUBLICATIONS

Virnich, et al.: "How to Improve Transient Engine Performance of HD Hydrogen Engines while Maintaining Lowest NOx Emissions," 42nd Int'l Vienna Motor Symposium, (2021), pp. 1-10, XP93036791AI.

(Continued)

*Primary Examiner* — Grant Moubry
(74) *Attorney, Agent, or Firm* — NORTON ROSE FULBRIGHT US LLP

(57) ABSTRACT

A method for controlling a turbocharged hydrogen engine for burning an air-hydrogen mixture having an air-hydrogen ratio λ greater than 1. The hydrogen engine is configured to assume steady operating states and transient operating states, wherein ignition timings are more retarded in the transient operating states than in the steady operating states.

9 Claims, 2 Drawing Sheets

(56) References Cited

U.S. PATENT DOCUMENTS

| | | | | |
|---|---|---|---|---|
| 10,267,239 B2* | 4/2019 | Takahashi | | F02D 15/02 |
| 11,174,800 B2* | 11/2021 | Wang | | F02D 19/0615 |
| 2013/0047957 A1* | 2/2013 | Breuer | | F02D 41/0007 |
| | | | | 60/605.1 |
| 2014/0000555 A1* | 1/2014 | Glugla | | F02P 5/1504 |
| | | | | 123/305 |
| 2015/0075487 A1* | 3/2015 | Glugla | | F02D 41/30 |
| | | | | 123/299 |
| 2015/0219025 A1* | 8/2015 | Koch | | F02D 13/023 |
| | | | | 60/611 |
| 2017/0306917 A1* | 10/2017 | Kim | | F02M 26/44 |
| 2022/0049668 A1* | 2/2022 | Prümm | | F02D 41/0027 |

FOREIGN PATENT DOCUMENTS

| DE | 102018216860 A1 | 4/2020 |
|---|---|---|
| WO | 2014044388 A1 | 3/2014 |

OTHER PUBLICATIONS

International Search Report for PCT/EP2022/086390, Issued Apr. 17, 2023.

\* cited by examiner

METHOD AND CONTROL UNIT FOR CONTROLLING A TURBOCHARGED HYDROGEN ENGINE

FIELD

The present invention relates to a method and a control unit for controlling a turbocharged hydrogen engine.

BACKGROUND INFORMATION

Hydrogen potentially offers $CO_2$-free energy for mobile and stationary applications. In addition to fuel cells, combustion engines using hydrogen as fuel are also available, which have advantages for certain market segments, such as greater robustness in off-highway applications. In addition, established technologies are used, resulting in lower production and maintenance costs.

In order to ensure combustion stability in hydrogen engines and at the same time limit nitrogen oxide emissions, it is sensible to operate hydrogen engines in lean operation, i.e., with high air excess. The excess air number chosen for this purpose is ideally 2 or greater. In this case, only a portion of the fresh air participates in the combustion, which can lead to losses in stationary power density and dynamic torque build-up. The hydrogen engine therefore follows the torque request only with a delay, in particular in comparison to the torque build-up of a modern diesel or gasoline engine.

SUMMARY

It is an object of the present invention to propose a method and/or a controller for a hydrogen engine in order to provide improved response behavior.

This object may be achieved by a method for controlling a turbocharged hydrogen engine with features of the present invention. Advantageous example embodiments and developments of the present invention can be found in the disclosure herein.

The present invention relates to a method for controlling a turbocharged hydrogen engine for burning an air-hydrogen mixture having an air-hydrogen ratio $\lambda$ greater than 1, wherein the hydrogen engine is designed to assume steady operating states and transient operating states, wherein ignition timings are more retarded in the transient operating states than in the steady operating states.

The hydrogen engine in question comprises one or more cylinders arranged in a desired manner in an engine block. An axially movable piston is arranged in each cylinder and is moved by a hydrogen-air mixture that is compressed and ignited in a chamber delimited by the piston. The ignition timing at which an ignition spark is caused at a spark plug is made to be dependent on the position of the piston and generally depends on a flame propagation speed and various operating and environmental parameters of the hydrogen engine. It is common to adjust the ignition timing toward an earlier point in time as the engine speed increases, i.e., to points in time close to top dead center.

It is common to set the ignition timing for each operating state of the hydrogen engine in such a way that optimum efficiency is achieved. This could, inter alia, include an evaluation of the so-called MFB50 point (mass fraction burned), at which half of the hydrogen has been burned. The ignition timing can be adjusted within certain limits in order to optimize the combustion in a current operating state and to avoid both knocking and backfiring. At full load, for example, knocking could occur if the ignition timings are too early, while backfiring could occur if the ignition timings are too late. This makes it possible to define a kind of ignition timing range in which the ignition timings should be. The ignition timing range may depend on the load and tend to be earlier at partial load than at full load.

During measurements on an engine test bench, it was surprisingly found that retardation of the ignition angle in hydrogen engines offers advantages in terms of nitrogen oxide emissions and combustion stability. This can reduce the provided excess air. It is thus possible to temporarily convert a larger amount of hydrogen into heat. In addition, as a result of such a retardation of the ignition timing, a higher proportion of the energy released by the combustion generally remains in the exhaust gas flowing out of the hydrogen engine. The associated increase in exhaust gas enthalpy can improve the response behavior of the turbocharger arranged in the exhaust path, and consequently of the compressor coupled thereto for increasing the air mass flow, and thus the total torque build-up of the engine.

Consequently, the method according to the present invention can significantly improve transient operating states, and the hydrogen engine controlled by this method can be operated significantly more dynamically to achieve full load operation more quickly. According to the present invention, this is carried out very cost-efficiently since modifications to the hydrogen engine are practically unnecessary.

According to an example embodiment of the present invention, alternatives for improving the response behavior of a hydrogen engine may include alternative combustion strategies and measures for increasing the gas mass in the cylinders. An alternative combustion strategy would, for example, be stoichiometric engine operation, which is, however, associated with a tendency to knock, in particular in the higher load range, as mentioned above. Fuel consumption is also increased in comparison to lean combustion processes. Measures for increasing the gas mass in the cylinder may, for example, include electrical charging, support by a separate electric machine, air injection into an intake manifold of the engine, and other measures. However, these measures could significantly increase the system complexity and the production costs.

Adjusting the ignition angle to later can temporarily lead to increased fuel consumption. However, since the retardation is provided exclusively for transient and consequently non-steady operating states in which an increased torque demand is desired, this additional consumption as a whole is significantly limited. As soon as the desired boost pressure is reached in the hydrogen engine, the ignition angle can be shifted back into a range for optimal (mechanical) efficiency.

According to an example embodiment of the present invention, the air-hydrogen ratio $\lambda$ can be set to a greater value in the steady operating states than in the transient operating states. Consequently, the cylinders of the hydrogen engine can be filled to a much greater extent in transient operating states than in steady operating states. This results in an increased exhaust gas enthalpy and consequently in an at least briefly improved response behavior of the turbocharger to increase the torque.

According to an example embodiment of the present invention, the air-hydrogen ratio $\lambda$ can be in a range of 2 to 4 in the steady operating states and at 2 or lower, preferably in a range of 1.7 to 2, in the transient operating states. This achieves very high combustion stability and low nitrogen oxide emissions in the steady operating states. In this case, demands for a rapid and significant torque increase are comparatively low and the operation of the hydrogen engine is less dynamic. However, this makes operation in a rather lean range possible. In transient operating states, on the other hand, richer mixtures can be used, at least briefly. However, an air-hydrogen ratio below approximately 1.5 to 1.7 should be avoided in order to further reduce the risk of uncontrolled combustion. It could be sensible to limit the air-hydrogen ratio downward to, for example, 1.7.

According to an example embodiment of the present invention, the ignition timings in the transient operating states could be in a range of 20° to 45°, preferably in a range of 38° to 42°, after top dead center. The flame propagation speed of hydrogen is significantly higher than that of gasoline or diesel so that the ignition timings can be significantly after top dead center. The later the ignition timing, the more the cylinder in question can be loaded with an air-hydrogen mixture. It may therefore be advisable to adjust an ignition timing by up to 45° after top dead center in transient operating states when a higher torque increase is demanded.

According to an example embodiment of the present invention, the ignition timings in the steady operating states could be in a range of 0° to 25°, preferably in a range of 5° to 20°, after top dead center. This ensures optimal combustion with low nitrogen oxide formation.

The ignition timings in the transient operating states could be retarded with increasing torque increase. Consequently, the greater the demanded increase in torque, the later the ignition timing could be. The exhaust gas enthalpy can thus be increased as needed to improve the response of the turbocharger and thus of a compressor coupled to the turbocharger, to increase the air mass flow, but can be generated in steady-state phases in a way that optimizes consumption and emissions. It would be possible to convert a torque increase demand linearly into an ignition timing adjustment. It is also possible to carry out this relationship exclusively for torque increase demands that are in a range of 25% to 100% and preferably of 50% to 100% of a theoretical maximum torque increase demand. It is also possible to accordingly retard the ignition timing only once a threshold value for a desired torque increase has been reached.

The ignition timings could also be adjusted back into the range of steady operating states when a specified pressure is reached at a compressor coupled to the turbocharger of the hydrogen engine. Since the measure for improving the response behavior is only necessary in the transient operating states, the ignition timing can consequently be adjusted back into the optimal range as soon as the desired boost pressure is reached. The efficiency is then back in the optimal range.

The air-hydrogen ratio $\lambda$ in the transient operating states could be lowered by increasing an amount of hydrogen injected into the hydrogen engine. This increases the exhaust gas enthalpy, and the turbocharger is accordingly briefly significantly more loaded mechanically. Temporarily, due to the mass inertia of the combination of turbocharger and compressor, the air mass flow for the combustion initially remains largely constant or initially increases only slightly.

The present invention also relates to a control unit for controlling a turbocharged hydrogen engine for burning an air-hydrogen mixture, wherein the control unit is designed to perform the method according to the present invention described above.

Finally, the present invention relates to a hydrogen engine comprising at least one cylinder, a turbocharger, a compressor and the aforementioned control unit of the present invention. This control unit is operationally coupled to the components of the hydrogen engine and is designed to control the operation of the hydrogen engine.

Further measures improving the present invention are explained in more detail below, together with the description of the preferred exemplary embodiments of the present invention, with reference to figures.

DETAILED DESCRIPTION OF EXAMPLE EMBODIMENTS

Figure 1:
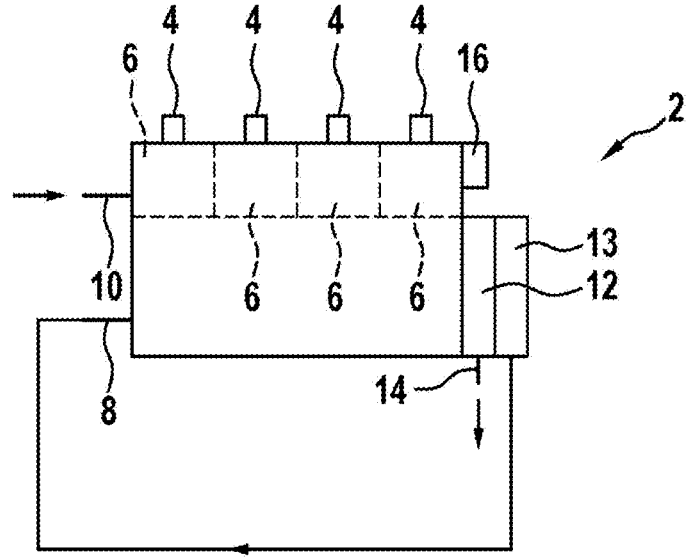
FIG. 1 is a schematic, block-based representation of a hydrogen engine.

FIG. 1 shows a hydrogen engine 2 comprising a plurality of cylinders 6 in which an air-hydrogen mixture is ignited by spark plugs 4. The hydrogen engine comprises an air inlet 8 and a hydrogen inlet 10. A turbocharger 12 is provided, through which exhaust gas flows, which exits from an exhaust outlet 14. The turbocharger 12 is coupled to a compressor 13, which compresses air and conveys air into the air inlet 8. The representation here is very schematic and can be supplemented by conventional line and valve arrangements.

A control unit 16 is coupled to the hydrogen engine 2 and can, inter alia, cause the ignition of the spark plugs 4, wherein the ignition is generally correlated with an angular position of an engine shaft (not shown). A plurality of sensors is provided, which are not shown here and which make it possible for the control unit 16 to recognize a current operating state of the hydrogen engine 2. These sensors could, for example, be temperature sensors, pressure sensors and mass flow sensors, which can be arranged at different locations on the hydrogen engine 2.

The control unit 16 is designed to perform a method for controlling the hydrogen engine 2 for burning an air-hydrogen mixture with an air-hydrogen ratio $\lambda$ greater than 1, wherein the hydrogen engine 2 is designed to assume steady operating states and transient operating states. The control unit 16 is designed such that ignition timings are in transient operating states later than in steady operating states. The turbocharger 12 can then be subjected to a significantly greater exhaust gas enthalpy and can support the torque build-up of the hydrogen engine 2 through greater acceleration of the compressor 13. If greater dynamics are demanded, the ignition timings can be adjusted up to a maximum of approximately 40°-45° after top dead center (TDC). If the desired torque build-up by the hydrogen engine 2 has at least approximately occurred, or if a desired pressure is present at the compressor 13, the ignition timing can be shifted back into the optimal range, i.e., back toward top dead center.

The air-hydrogen ratio $\lambda$ is set to a greater value, approximately in a range of 3 to 4, in the steady operating states than in the transient operating states. In the transient operating states, on the other hand, the air-hydrogen ratio is below 3, preferably in a range of 2 to 2.5. This can be achieved in particular by temporarily filling the cylinder 6 with more hydrogen.

Figure 2A:
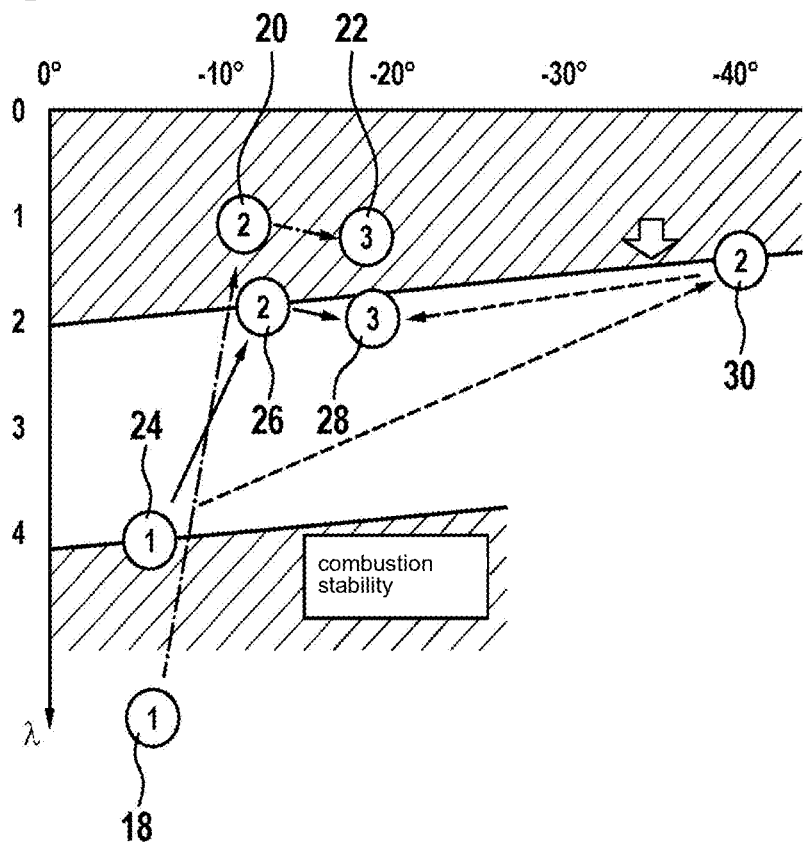
FIGS. 2A and 2B are combustion and torque diagrams.
Figure 2B:
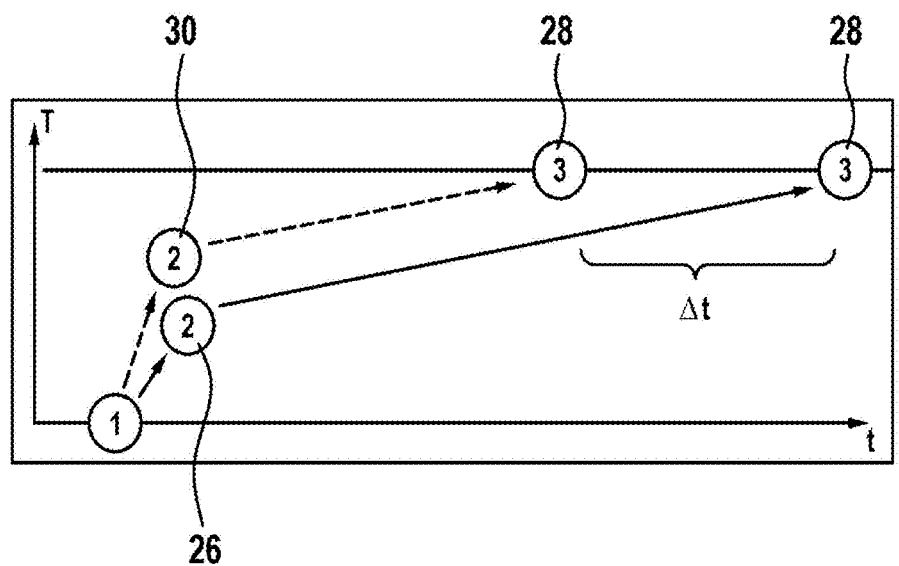

FIGS. 2A and 2B show two diagrams representing the optimization of the combustion in the hydrogen engine 2.

In a first diagram in FIG. 2A, various operating points of combustion engines are plotted as a function of the air-fuel ratio A on the vertical axis and the ignition timing in degrees after top dead center (TDC) on the horizontal axis. For comparison to the hydrogen engine 2, a first operating point 18, a second operating point 20 and a third operating point 22 of a diesel engine are shown with a dash-dotted line. The first operating point 18 is at an air-fuel ratio λ of more than 4 and corresponds to a partial load operation. A full load operation, on the other hand, is represented by the third operating point 22. The second operating point 20 is passed through on the way to the third operating point 22. When the torque of the diesel engine builds up quickly, only an injection system responds initially since the air-supplying air system is too slow to immediately build up a higher air mass flow. The second operating point 20 passed through can be at the smoke limit of the engine. The second operating point 20 is transient, while the first operating point 18 and the third operating point 22 are steady. At the third operating point 22, a boost pressure is sufficient to introduce a larger air mass flow into the engine. Ignition timings are continuously retarded during the transition from the first operating point 18 to the third operating point 22.

A conventional hydrogen engine is controlled in a similar manner. Here, analogously to the diesel engine, three operating states 24, 26 and 28 are shown, which correspond to the partial load operation, a transient state and the full load operation. The ignition timings are continuously retarded. The air-hydrogen ratio λ decreases from approximately 4 to just over 2. The curve between these three operating states 24, 26 and 28 is shown with solid lines.

The control according to the present invention is indicated by the dashed line. Here, the first operating state 24, a second operating state 30 and the third operating state 26 are assumed one after the other. In contrast to the second operating state of the conventional hydrogen engine, the second operating point 30 in the control according to the present invention is located at a significantly different location in the diagram of FIG. 2A. Here, the ignition timing is retarded significantly beyond the ignition timing of the third operating state 28 so that the ignition timing is significantly higher in the transient operating state than in the steady operating states 24 and 28. Thus, the exhaust gas enthalpy can be increased significantly and the boost pressure can be built up more quickly so that a stronger air mass flow can be built up in the shortest possible time. For example, the ignition timing in the second operating state 30 is approximately 40° after top dead center, while in full load operation, i.e., in the third operating state 28, it is approximately 20° after TDC.

Operating limits of the hydrogen engine 2 are delimited by hatched areas. The air-hydrogen ratio λ can be approximately between 2 and 4 at earlier ignition timings, wherein these limits are reduced somewhat with later ignition timings to later and are approximately between 1.5 and 3.5 for ignition timings of approximately 40° after top dead center.

FIG. 2B shows a diagram of the corresponding curves of the torque T of the conventional hydrogen engine and of the hydrogen engine 2 controlled according to the present invention. Here, the torque in the second operating state 30 of the hydrogen engine 2 controlled according to the present invention is significantly higher than the torque of the hydrogen engine controlled in a conventional manner in its second operating state 26, so that the third operating state 28 is reached significantly more quickly in the hydrogen engine 2 controlled according to the present invention than in the hydrogen engine controlled in a conventional manner. The increase in dynamics is indicated by the time difference Δt.

The invention claimed is:

1. A method for controlling a turbocharged hydrogen engine for burning an air-hydrogen mixture with an air-hydrogen ratio λ greater than 1, wherein the hydrogen engine is configured to assume steady operating states and transient operating states, the method comprising the following:
controlling the hydrogen engine so that ignition timings are more retarded in the transient operating states than in the steady operating states,
wherein the air-hydrogen ratio λ is set to a greater value in the steady operating states than in the transient operating states.

2. The method according to claim 1, wherein the air-hydrogen ratio λ is in a range of 2 to 4 in the steady operating states and at 2 or lower in the transient operating states.

3. The method according to claim 1, wherein the ignition timings in the transient operating states are in a range of 30° to 45° after top dead center.

4. The method according to claim 1, wherein the ignition timings in the steady operating states are in a range of 0° to 25° after top dead center.

5. The method according to claim 1, wherein the ignition timings in the transient operating states are retarded relative to the ignition timings in the steady operating states, and wherein the ignition timings are retarded to later values with increasing magnitude of a torque increase demand.

6. The method according to claim 1, wherein the ignition timings are adjusted back to within an ignition timing range corresponding to the steady operating states when a specified pressure is reached at a compressor coupled to a turbocharger of the hydrogen engine.

7. The method according to claim 1, wherein the air-hydrogen ratio λ in the transient operating states is lowered by increasing an amount of hydrogen injected into the hydrogen engine.

8. A control unit configured to control a turbocharged hydrogen engine for burning an air-hydrogen mixture ratio λ greater than 1, wherein the hydrogen engine is configured to assume steady operating states and transient operating states, the control unit is configured to:
control the hydrogen engine so that ignition timings are more retarded in the transient operating states than in the steady operating states,
wherein the air-hydrogen ratio λ is set to a greater value in the steady operating states than in the transient operating states.

9. A hydrogen engine, comprising:
at least one cylinder;
a turbocharger;
a compressor; and
a control unit configured to control the hydrogen engine for burning an air-hydrogen mixture ratio λ greater than 1, wherein the hydrogen engine is configured to assume steady operating states and transient operating states, the control unit being configured to:
control the hydrogen engine so that ignition timings are more retarded in the transient operating states than in the steady operating states,
wherein the air-hydrogen ratio λ is set to a greater value in the steady operating states than in the transient operating states.

* * * * *